Feb. 14, 1961 M. O. FARLEY 2,971,643
BALE WRAPPER
Filed April 1, 1957

INVENTOR.
MARVIN O. FARLEY

BY HIS ATTORNEYS.
HARRIS, KIECH, FOSTER & HARRIS

United States Patent Office 2,971,643
Patented Feb. 14, 1961

2,971,643
BALE WRAPPER

Marvin O. Farley, El Centro, Calif., assignor to Bale Guard Corporation, El Centro, Calif., a corporation of California Filed Apr. 1, 1957, Ser. No. 649,874

1 Claim. (Cl. 206—83.5)

The present invention relates generally to the packaging art and, more particularly, to wrapping means for a bale of expansible material, such as cotton, wool, and the like.

Conventionally, cotton is baled by compressing it into a generally rectangular body the sides of which are encircled by bands in planes generally parallel to the ends thereof. The mass of cotton to be baled is placed in a press under substantial pressure so that the volume of the mass is greatly reduced, the bands being secured while the bale is still in the press.

It is standard practice at the present time to at least partially cover cotton bales with coarse mesh-like or net-like wrappers, usually of jute, applied thereto before the bands are applied and secured. Such conventional wrappers afford only very limited protection to the cotton within the bale and damage thereto is commonplace. For example, conventionally baled cotton is frequently contaminated by dirt, grease, water, rust from the bands, and the like. Such contamination of the cotton within the bale is a serious matter since a very substantial portion of each bale may have to be discarded at the mill to eliminate the soiled portions thereof before the unsoiled portions can be processed. Not only does the cotton which must be discarded in this manner represent a serious economic loss, but the labor involved in separating the soiled cotton in each bale from the unsoiled portions thereof is very substantial. Furthermore, the cotton tends to cling to the coarse jute wrappers which are conventionally used to partially cover each bale and such cotton must be detached from the wrappers, this also involving substantial labor costs.

Another disadvantage of conventional practice is that there is no control over the moisture content of the cotton in the bale. For example, the weight of a bale may increase a substantial amount through water absorption during shipment from a relatively arid region where the cotton is grown to a humid region near the coast where the cotton is processed, or transferred to ships. Not only is this undesirable from the standpoint of the false bale weights incurred, but it is frequently necessary, where moisture absorption is excessive, for the mill to at least partially dehydrate the cotton in connection with obtaining the moisture content necessary for spinning and weaving.

Conventional bale wrapping practices are subject to another serious disadvantage in that the resulting cotton bales are very susceptible to spark or flash ignition, considerable quantities of cotton being lost each year through fires resulting from such sources.

A primary object of the present invention is to avoid or minimize the foregoing and various other disadvantages of conventional baling practices by completely enclosing each bale in a wraper which prevents soilage, minimizes water absorption, and minimizes the danger of spark or flash ignition.

More particularly, a primary object of the invention is to completely wrap each bale with woven fabric carrying a layer of material substantially impervious to soiling agents of the character hereinbefore described, substantially impervious to water, and resistant to flash or spark ignition.

Preferably, the fabric employed is a relatively coarse weave cotton fabric, although other materials may be utilized. This fabric is impregnated with, or coated with, a suitable impervious material, such as a synthetic resin, one example of a suitable material being polyethylene, although numerous others might be used. For reasons which will become apparent, this material must have stretchability.

An important object of the invention is to so orient the woven fabric wrapper that it is on the bias relative to the encircling bands, i.e., to so orient the warp and woof threads that they extend generally diagonally of the sides of the bale and make angles of at least approximately 45° with the encircling bands.

By wrapping the bale in the foregoing manner, the fabric is capable of substantial stretching, without rupture of the threads thereof, between and adjacent the bands as the cotton bulges outwardly upon application of the bands and removal of the bale from the press, which is an essential feature of the invention. This stretching of the fabric to accommodate the interband bulging of the cotton is achieved by orienting the fabric on the bias relative to the bands even though the compressed body of cotton is completely and rather tightly wrapped.

When the fabric stretches diagonally of the warp and woof threads thereof in the foregoing manner to compensate for interband bulging of the cotton, the impervious material carried by the fabric must also stretch without rupture to preserve the protective qualities thereof, there being various materials which are suitable for the purpose, as hereinbefore outlined.

The foregoing objects, advantages, features and results of the present invention, together with various other objects, advantages, features and results thereof which will be apparent to those skilled in the packaging art in the light of this disclosure, may be achieved with the exemplary embodiment of the invention described in detail hereinafter and illustrated in the accompanying drawing, wherein.

Figure 1:
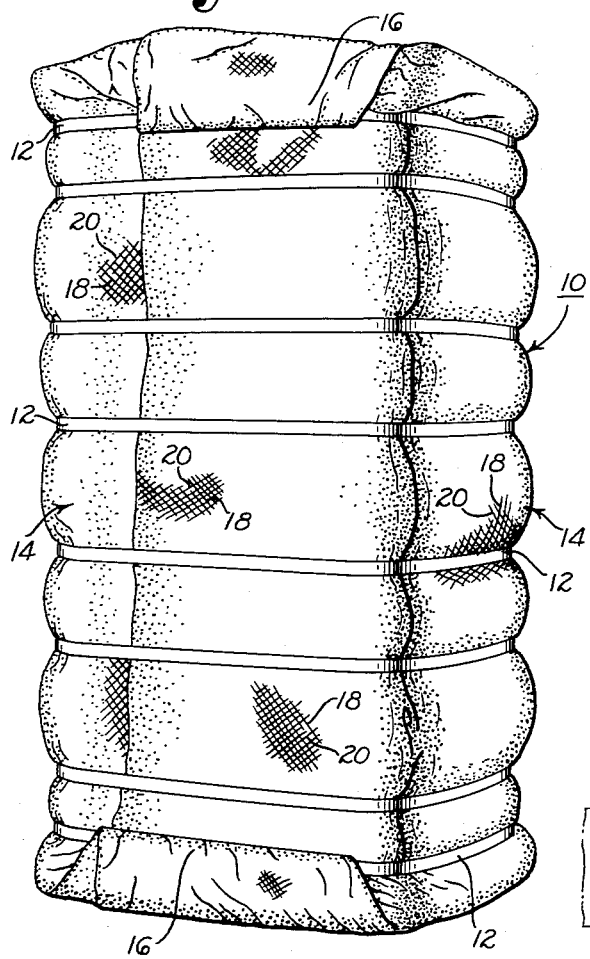
Fig. 1 is a perspective view of a cotton bale which has been wrapped in accordance with the present invention.
Figure 2:
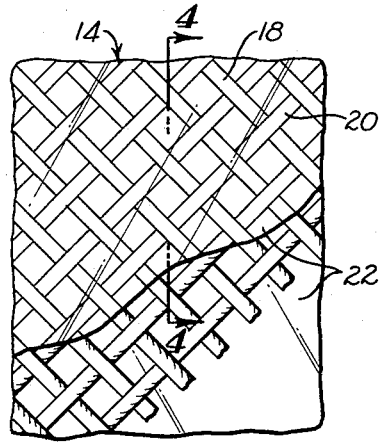
Fig. 2 is an enlarged, fragmentary, semidiagrammatic view of a portion of the wrapper of the invention before stretching thereof.

Referring particularly to Fig. 1 of the drawing, illustrated therein is a cotton bale which is completely enclosed by a wrapper 10 in accordance with the invention, the compressed body of cotton within the wrapper being maintained in a compressed state by conventional metallic bands 12 overlying the wrapper and disposed in planes parallel to the ends of the bale. The wrapper 10 preferably includes two sheets 14 respectively applied to opposite sides of the compressed body of cotton and wide enough to overlap to a considerable extent, these sheets being long enough to cover the ends of the bale. The corners of the sheets 14 are tucked under the bands 12 nearest the ends of the bale, as shown at 16. As will be apparent, the result is a completely wrapped cotton bale, The two sheets 14 may be applied to the body of cotton prior to compression thereof in the same manner that the partially-enveloping mesh-like or net-like wrapping sheets of jute are conventionally applied. The specific procedure to be followed will be apparent to those skilled in the art so that a further discussion thereof herein is unnecessary.

As clearly shown in Fig. 1, the bale bulges between the bands 12, due partially to further compression of the cotton under the bands as the bands are tightened in the press, but due primarily to expansion of the cotton between the bands upon removal of the bale from the press, the bulging being most pronounced on the narrower sides of the bale. Many past efforts to completely and imperviously wrap cotton bales to achieve the results hereinbefore discussed have been defeated by such bulging between the bands since the resultant stretching of the wrappers has caused them to rupture. The present invention prevents rupturing of the wrapping sheets 14 between the bands 12 in a manner which will now be considered.

Figure 3:
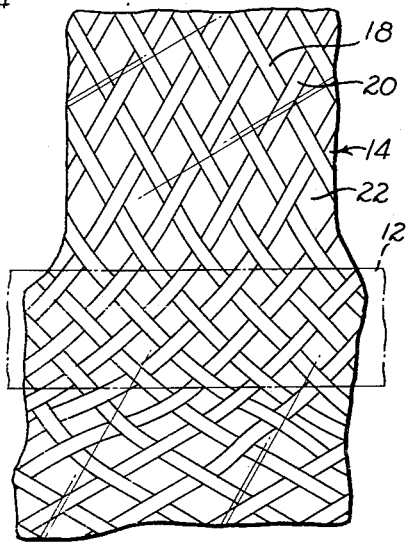
Fig. 3 is an enlarged, fragmentary, semidiagrammatic composite view of a portion of the wrapper of the invention after stretching thereof and illustrating different patterns into which the wrapper may be stretched upon interband bulging.
Figure 4:
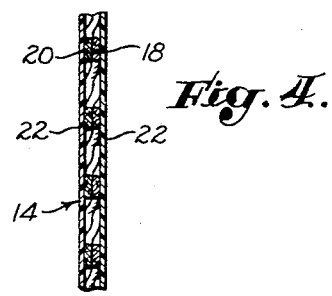
Fig. 4 is a sectional view taken along the arrowed line 4—4 of Fig. 2.

Each of the sheets 14 includes a woven fabric layer having warp and woof threads 18 and 20 oriented on the bias relative to the bands 12, these threads preferably making angles of substantially 45° with the bands. Consequently, as shown in Fig. 3, when the cotton bulges outwardly adjacent one of the bands 12, the fabric in the sheets 14 is capable of very substantial stretching, the warp and woof threads 18 and 20 being pulled into diamond-shaped patterns as a result thereof. In Fig. 3, the area above the band 12 is shown as having been subjected to considerably more stretching than the area below the band for illustrative purposes, the warp and woof threads 18 and 20 having been pulled much closer to parallelism above the band 12 than therebelow. As will be understood, the amount of stretching depends upon the amount the bale tends to bulge in any particular area.

The fabric of the sheets 14 is preferably a relatively coarse cotton fabric, although other materials may be employed. Preferably, the sheets 14 are rectangular sheets the major axes of which extend parallel to the major axis of the bale. These rectangular sheets 14 may be cut on the bias to obtain the desired orientation of the warp and woof threads 18 and 20 relative to the sides of the bale and to the bands 12. Alternatively, rectangular sheets 14 may be woven on the bias directly, it being understood that the manner in which the sheets are formed is immaterial to the particular invention which is the subject of the present application.

In order to prevent soilage of the cotton within the bale, to prevent water absorption thereby, and to prevent flash or spark ignition thereof, the fabric layer of each of the sheets 14 carries at least one layer 22 of a stretchable, impervious material, two such layers being shown in the drawing respectively applied to opposite sides of and bonded to the fabric layer. However, it will be understood that the fabric layer of each sheet may be impregnated with a stretchable, impervious material also. The material of the layer or layers 22 may be any material having the desired characteristics of stretchability and imperviousness, numerous synthetic resins, for example, such as polyethylene, being suitable for the purpose.

One advantage of applying stretchable, impervious layers 22 to both sides of the fabric layer of each sheet 14 is that any perforations which may inadvertently be formed in one layer are likely to be opposite unperforated portions of the other layer to maintain the desired covering effect. The inner layer 22 also prevents sticking of the cotton within the bale to the fabric layer of each sheet 14, while the outer layer 22 protects the fabric layer against spark or flash ignition and other undesirable circumstances.

Once the bale has been wrapped in accordance with the present invention, it resists soiling from various causes, has a minimum tendency to absorb moisture even when transported from a very arid region to a very humid one, and resists ignition, all of which are important features of the invention.

It will be understood that the present invention is applicable to bales of any density. Also, while the invention has been described as applied to completely wrapped bales and completely, or substantially completely, sealed bales, it is also applicable to partially wrapped bales and to vented bales. Venting, when desired, may be achieved in various ways, as by omitting the covering layers 22 at spaced intervals.

Although an exemplary embodiment of the invention has been disclosed herein for purposes of illustration, it will be understood that various minor changes, modifications and substitutions may be incorporated in such embodiment without departing from the spirit of the invention as defined by the following claim.

I claim as my invention:

A generally rectangular bale of compressible material comprising: a woven fabric cover encompassing said material; spaced parallel bands encircling said material and cover and being under tension, whereby said material and cover bulge outwardly between said bands; said woven fabric cover being arranged with its warp and woof threads extending oblique to said bands; said cover including a continuous coating of stretchable nonadherent impervious material on each face of said fabric, whereby said cover and impervious material may stretch to conform to said bulges without rupturing.

References Cited in the file of this patent

UNITED STATES PATENTS

| | | |
|---|---|---|
| 214,673 | Luce | Apr. 22, 1879 |
| 2,349,710 | Evans | May 23, 1944 |
| 2,616,469 | Katz et al. | Nov. 4, 1952 |
| 2,705,557 | Hartman | Apr. 5, 1955 |